(12) United States Patent
Tu

(10) Patent No.: US 8,682,375 B2
(45) Date of Patent: *Mar. 25, 2014

(54) METHOD, APPARATUS, COMPUTER PROGRAM PRODUCT AND SYSTEM FOR PROVIDING DYNAMIC ASSIGNMENT OF SESSION CAPABILITIES

(75) Inventor: Fangqiu Tu, Caldwell, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 127 days.

This patent is subject to a terminal disclaimer.

(21) Appl. No.: 13/415,954

(22) Filed: Mar. 9, 2012

(65) Prior Publication Data

US 2012/0165061 A1    Jun. 28, 2012

Related U.S. Application Data

(63) Continuation of application No. 11/689,066, filed on Mar. 21, 2007, now Pat. No. 8,219,087.

(51) Int. Cl.
*H04M 3/00* (2006.01)

(52) U.S. Cl.
USPC .................. 455/518; 455/412.1; 455/414.1; 370/329

(58) Field of Classification Search
USPC ............... 455/435.1, 414.1, 432.1, 518, 421, 455/422.1, 556.2, 73, 78; 709/227–229; 370/328–338
See application file for complete search history.

(56) References Cited

U.S. PATENT DOCUMENTS

| 2003/0225832 A1* | 12/2003 | Ludwig ..................... 709/204 |
| 2004/0198308 A1 | 10/2004 | Hurst et al. |
| 2004/0225650 A1 | 11/2004 | Cooper et al. |
| 2005/0255811 A1* | 11/2005 | Allen et al. .................. 455/78 |
| 2007/0100981 A1 | 5/2007 | Adamczyk et al. |
| 2008/0127313 A1 | 5/2008 | Payne et al. |
| 2008/0201785 A1* | 8/2008 | Overcash ..................... 726/35 |
| 2008/0227440 A1* | 9/2008 | Settepalli ................... 455/418 |

* cited by examiner

*Primary Examiner* — Chuong A Ngo

(57) ABSTRACT

An apparatus for providing dynamic assignment of session capabilities such as buddy list capabilities includes a processing element. The processing element may be configured to receive a message associated with a communication session with a network node, acquire service plan based capabilities associated with the network node, receive device based capabilities associated with the network node, and determine session based capabilities associated with the service based on the device based capabilities and the service plan based capabilities on a per subscriber basis.

20 Claims, 4 Drawing Sheets

METHOD, APPARATUS, COMPUTER PROGRAM PRODUCT AND SYSTEM FOR PROVIDING DYNAMIC ASSIGNMENT OF SESSION CAPABILITIES

RELATED APPLICATIONS

This Application is a continuation of U.S. patent application Ser. No. 11/689,066, filed on Mar. 21, 2007, the content of which is herein incorporated by reference.

TECHNOLOGICAL FIELD

Embodiments of the present invention relate generally to service provision techniques, and, more particularly, relate to a method, apparatus, computer program product and system for providing dynamic assignment of session capabilities such as buddy list capabilities for network nodes.

BACKGROUND

Given the ubiquitous nature of mobile electronic devices such as, for example, mobile communication devices like cellular telephones, many people are utilizing an expanding variety of applications that are executable at such mobile electronic devices. For example, applications for providing services related to communications, media sharing, information gathering, education, gaming, and many others have been developed, fueled by consumer demand. One particular area in which consumer demand has triggered an expansion of services relates to provision of services related to managing the establishment of communications with, for example, users of other mobile electronic devices. For example, a communication session may be established between various client devices via a network server. Protocols which may be used in such communication sessions may include, for example, Session Initiation Protocol (SIP), Motorola Push-to-Talk (M-PTT) protocol, and the like.

SIP is an application-layer control (signaling) protocol for creating, modifying, and terminating sessions with one or more participants. SIP is widely used as a signaling protocol for Voice over Internet Protocol (VoIP) and media sharing applications. SIP is addressing neutral, with addresses expressed as a uniform resource locator (URL), a uniform resource identifier (URI), a telephone number, an email like address, or the like. SIP is generally considered to be lightweight since it has a limited number of methods to reduce complexity, and transport-independent since it can be used with User Datagram Protocol (UDP), Transport Control Protocol (TCP) and other transport protocols.

M-PTT is an example of a SIP based protocol which may be employed for session based communications such as push-to-talk (PTT) communications. M-PTT signaling messages are text based messages which may be used to set up calls from one network node (e.g., a mobile terminal such as a mobile phone) to another. For example, M-PTT or another session based protocol may be used to set up a PTT call between two network nodes that have subscribed to a PTT service.

Some services provided to network subscribers or users may relate to the establishment of easily accessible lists of contact information, which are commonly known as buddy lists. A buddy list may store one or more contact names and associated contact information which may be utilized to establish communication with the associated contact. In various exemplary embodiments, a buddy list could include contact information for selected ones among fellow subscribers to a service or members of a group which may be defined by the user. A buddy list could be associated with a particular application, such as a buddy list for PTT, a buddy list for email, a buddy list for instant messaging, a buddy list for making phone calls, etc., or the buddy list could be a general listing of contacts by name in which each contact may be associated with one or more particular different applications as indicated by the corresponding stored contact information. A buddy list may also be configured to provide presence information to the user regarding individual and/or group contacts in the buddy list.

Buddy lists are often provided at a size that is governed on a per-system basis. In other words, in a communication network providing PTT services, in which the network may include a PTT server configured to support communications between numerous PTT clients, the PIT server is typically configured to provide buddy list sizes to various clients based on the smallest buddy list size supported by any commercial client in the system. For example, if a first client can support a buddy list size of 100 individual contacts and 50 contact groups and a second client can support a buddy list size of 200 individual contacts and 30 contact groups, the server may only support 100 individual contacts (i.e., the lesser of the individual contact capabilities of the first and second clients) and 30 groups (i.e., the lesser of the contact group sizes supported by the first and second clients). Thus, neither the first client nor the second client can take advantage of its corresponding buddy list size capabilities.

In general, the PTT server may be capable of supporting the largest from among the individual client buddy list sizes. However, given the current fixed-size buddy list approach in which the fixed-size is determined as described above, service providers typically do not provide different grades of service with respect to buddy list size and device capabilities are not able to be fully utilized on a consistent basis.

Accordingly, it may be desirable to provide a mechanism by which to address at least some of the problems described above.

BRIEF SUMMARY

A method, apparatus, computer program product and system are therefore provided for providing dynamic assignment of session capabilities such as buddy list size capabilities to be supported for network nodes. Thus, for example, service providers may be enabled to provide buddy list size support on a per-subscriber basis instead of a per-system basis. Thus, service providers may be enabled to dynamically change the buddy list size capabilities which the server can support for a particular client. For example, a user associated with the client may change his or her corresponding service plan and thus, the buddy list size capabilities supported by the server may be altered according to the parameters of the corresponding service plan. Additionally or alternatively, a user may acquire a new client device having changed buddy list size capabilities. Accordingly, the server can change the support provided based on the changes to the buddy list size capabilities and the corresponding service plan associated with the user. Thus, according to embodiments of the present invention, both users or subscribers and service providers may have the capability to request and/or support changes that may affect buddy list size capabilities associated with client devices and/or server devices on a dynamic basis. Furthermore, such changes may be employed, for example, without any need for new hardware or software installation at the corresponding client and/or server devices.

In one exemplary embodiment, a method of providing dynamic assignment of session capabilities is provided. The method may include receiving a message associated with a communication session with a network node, acquiring service plan based capabilities associated with the network node, receiving device based capabilities associated with the network node, and determining session based capabilities associated with the service based on the device based capabilities and the service plan based capabilities on a per subscriber basis.

In another exemplary embodiment, a computer program product for providing dynamic assignment of session capabilities is provided. The computer program product includes at least one computer-readable storage medium having computer-readable program code portions stored therein. The computer-readable program code portions include first, second, third and fourth executable portions. The first executable portion is for receiving a message associated with a communication session with a network node. The second executable portion is for acquiring service plan based capabilities associated with the network node. The third executable portion is for receiving device based capabilities associated with the network node. The fourth executable portion is for determining session based capabilities associated with the service based on the device based capabilities and the service plan based capabilities on a per subscriber basis.

In another exemplary embodiment, an apparatus for providing dynamic assignment of buddy list size is provided. The apparatus includes a processing element. The processing element may be configured to receive a message associated with a communication session with a network node, acquire service plan based capabilities associated with the network node, receive device based capabilities associated with the network node, and determine session based capabilities associated with the service based on the device based capabilities and the service plan based capabilities on a per subscriber basis.

In another exemplary embodiment, a system for providing dynamic assignment of buddy list size is provided. The system includes a provisioning sub-system and a subscriber database. The provisioning sub-system may be configured to enable modification to a subscriber service plan. The subscriber database may be configured to store service plan based capabilities for buddy list size on a per subscriber basis. The provisioning sub-system may be further configured to communicate changes to the service plan based capabilities to the subscriber database on a per subscriber basis. The subscriber database may be configured to update the corresponding stored service plan based capabilities.

Embodiments of the invention may provide a method, apparatus, computer program product and system for providing dynamic assignment of session capabilities such as a buddy list size. As a result, for example, client and server devices may negotiate buddy list size capabilities on a per-subscriber or per-client basis rather than on a per-system basis. Thus, network service providers may be capable of providing different grades of services with respect to buddy list size capabilities that network servers will support for each user based upon the user's service plan. The service plan of each user and the corresponding device capabilities of each user's respective client device may therefore be used to negotiate buddy list size capabilities during each communication session between respective client devices and a network server.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

Figure 3:
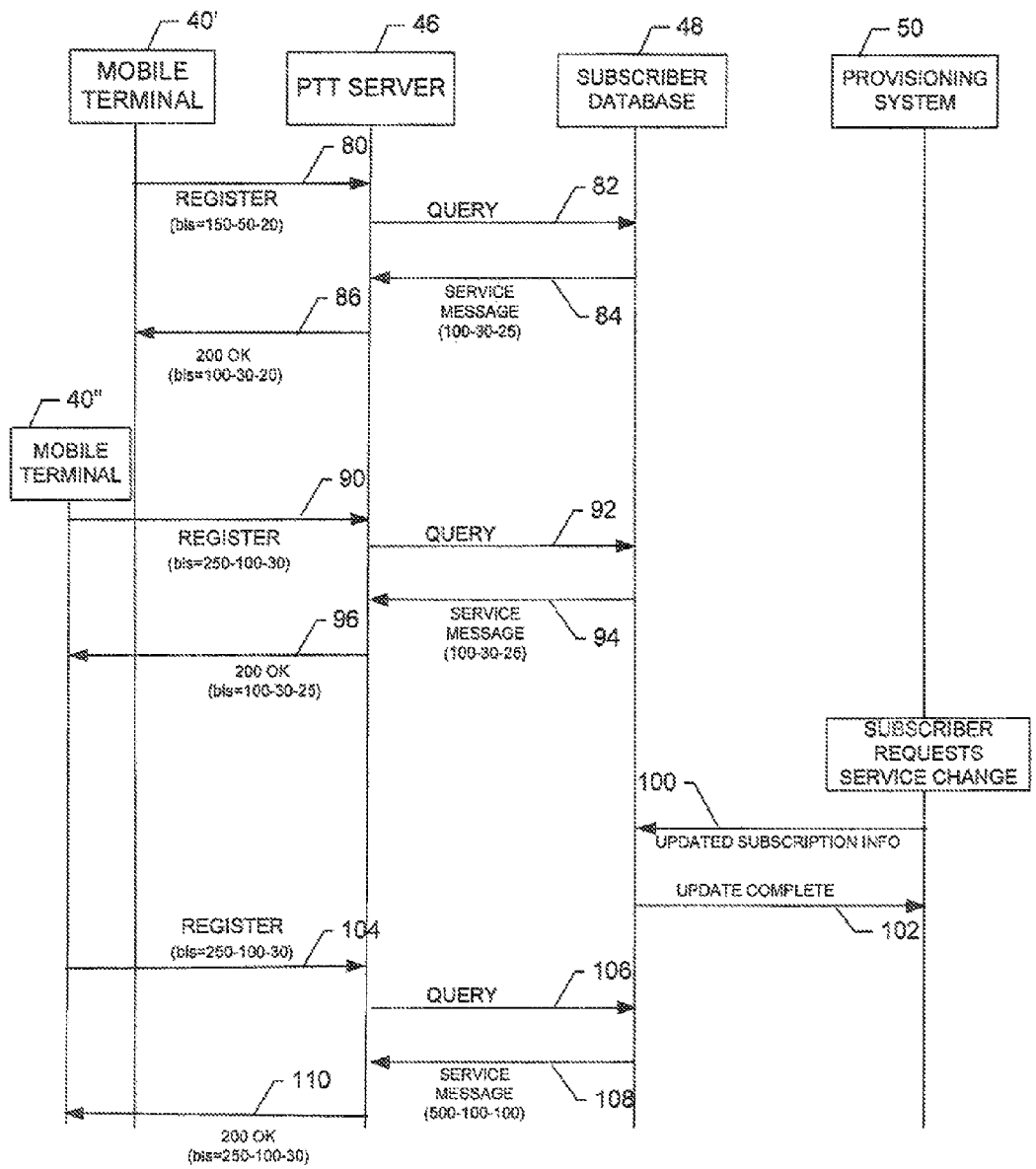
Figure 4:
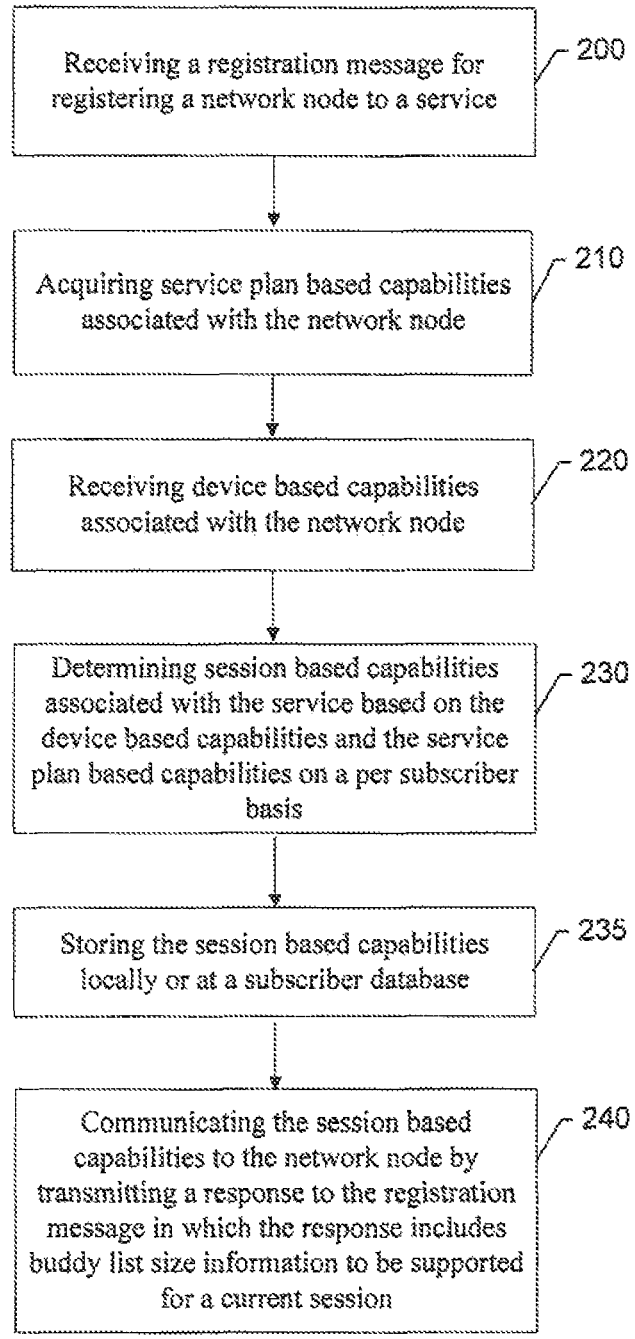

FIG. 3 illustrates a control flow diagram showing exemplary message flow for dynamically assigning a buddy list size capability according to an exemplary embodiment of the present invention; and FIG. 4 is a flowchart according to an exemplary method and program product from the perspective of a mobile terminal for providing dynamic assignment of buddy list size capabilities according to an exemplary embodiment of the present invention.

DETAILED DESCRIPTION

Exemplary embodiments are described hereinafter with reference to the accompanying drawings, in which exemplary embodiments and examples are shown. Like numbers refer to like elements throughout.

One or more embodiments may be implemented as a method, a device, or a computer program product. Accordingly, an embodiment may take the form of an entirely hardware embodiment, an entirely software embodiment, or an embodiment combining software and hardware aspects. Furthermore, implementations of an embodiment may take the form of a computer program product including a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

In certain embodiments referenced herein, a "computer" or "computing device" may be described. Such a computer may be, for example, a mainframe, server, desktop, laptop, or a hand held device such as a data acquisition and storage device, or it may be a processing device embodied within another apparatus such as, for example, a set top box for a television system or a wireless telephone. In some instances the computer may be a "dumb" terminal used to access data or processors over a network.

In certain embodiments referenced herein, a "network" or "network system" may be referenced. Such a network may be considered for example, a personal area network (PAN), a local area network (LAN), a wide area network (WAN), the Internet, etc. Such networks may include one or more devices, such as computers and peripheral devices. The networks may be configured to communicate with one or more external devices, systems, networks, or other sources through one or more interfaces. More specifically, one or more of the computers or peripheral devices may be configured to receive and/or transmit information to or through an external device, system, network, or other external source.

Figure 1:
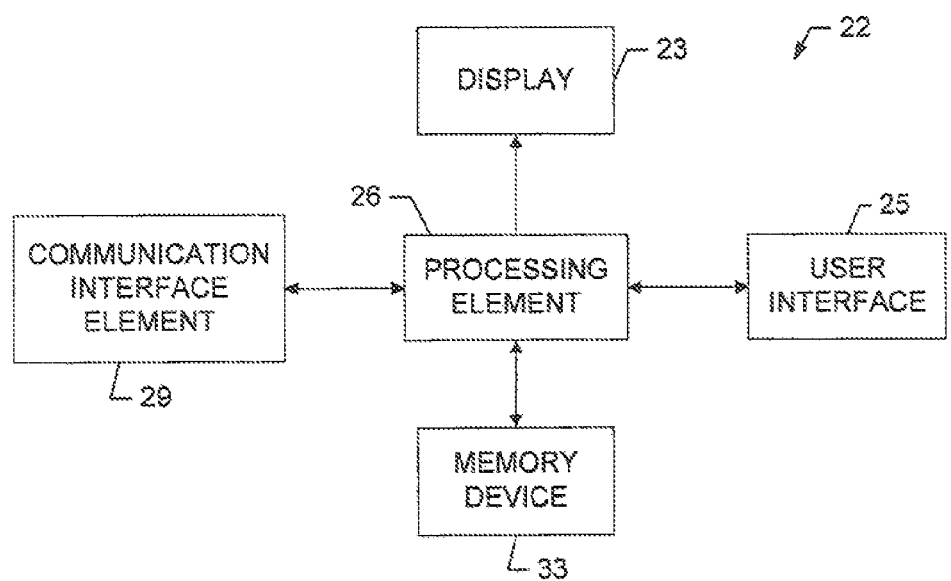
FIG. 1 is a schematic block diagram of a mobile terminal according to an exemplary embodiment of the present invention.

FIG. 1 is a schematic block diagram of a. mobile terminal or network component (e.g., a network node) which may act as a client device according to an exemplary embodiment of the present invention. It should be understood, however, that a mobile terminal as illustrated and hereinafter described is merely illustrative of one type of apparatus that would benefit from embodiments of the present invention and, therefore, should not be taken to limit the scope of embodiments of the present invention. Types of mobile terminals which may employ embodiments of the present invention include but are not limited to devices such as portable digital assistants (PDAs), pagers, mobile televisions, gaming devices, music players, laptop computers, mobile telephones and other types of audio, voice and text communications systems. In addition to mobile devices, fixed devices may also employ embodiments of the present invention.

As shown in FIG. 1, in addition to a display 23 (which may be omitted for certain network components) and user interface 25, a mobile terminal 22 may include a processing element 26, a communication interface element 29 and a memory device 33. The memory device 33 may include, for example, volatile or non-volatile memory. The memory device 33 may be configured to store information, data, applications, instructions or the like for enabling the mobile terminal 22 to carry out various functions in accordance with exemplary embodiments of the present invention. For example, the memory device 33 could be configured to store an application for enabling communication with other users, for example, via a session such as a Session Initiation Protocol (SIP) session, a push-to-talk (PTT) communication session or the like. Additionally or alternatively, the memory device 33 could be configured to store other data including, for example, multimedia content for communication or sharing with other terminals.

The processing element 26 may be embodied in many ways. For example, the processing element 26 may be embodied as a processor, a coprocessor, a controller or various other processing means or devices including integrated circuits such as, for example, an ASIC (application specific integrated circuit). In an exemplary embodiment, the processing element 26 may be configured to execute instructions stored in the memory device 33 or otherwise accessible to the processing element 26. In an exemplary embodiment, the processing element 26 may be configured to execute a communication session establishment application and/or a content sharing application stored in the memory device 33 or otherwise accessible to the processing element 26. Meanwhile, the communication interface element 29 may be embodied as any device or means embodied in either hardware, software, or a combination of hardware and software that is configured to receive and/or transmit data from and/or to a network.

The communication interface element 29 may include an antenna or multiple antennae in operable communication with a transmitter and/or a receiver. Accordingly, the mobile terminal 22 may be configured to communicate signals that may include signaling information in accordance with an air interface standard of an applicable cellular system, and also user speech and/or user generated data. As such, the mobile terminal 22 may be capable of operating with one or more air interface standards, communication protocols, modulation types, and access types.

The display 23 may be, for example, a conventional LCD (liquid crystal display) or any other suitable display known in the art upon which images may be rendered. The user interface 25 may include, for example, a keyboard, keypad, joystick, function keys, mouse, scrolling device, touch screen, or any other mechanism or input device by which a user may interface with the mobile terminal 22.

Figure 2:
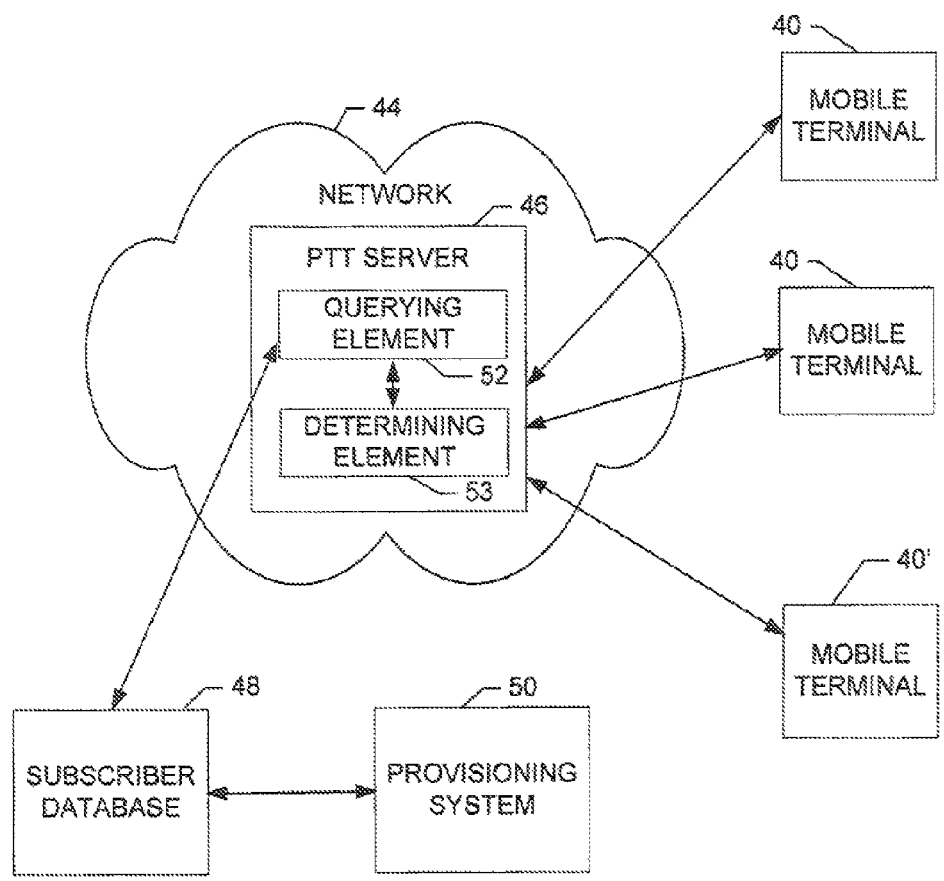
FIG. 2 is a schematic block diagram of a wireless communications system for establishing a communication session according to an exemplary embodiment of the present invention.

FIG. 2 is a schematic block diagram of a wireless communications system for establishing a communication session according to an exemplary embodiment of the present invention. In an exemplary embodiment, the system of FIG. 2 may be capable of facilitating communications in accordance with SIP (e.g., establishing a SIP session) and/or M-PTT (e.g., establishing a PTT call) although other communication protocols and communication sessions may also be utilized. As such, FIG. 2 is a simplified schematic diagram illustrating a system capable of supporting communication between network nodes such as mobile terminals 40. For example, SIP, M-PTT or the like, may be utilized to establish communication between the mobile terminals such as via a session which may be provided in connection with SIP, PTT or the like over a network 44. In this regard, it should be noted that the network 44 may include any combination of wireless or wired networks such as, for example, private networks, cellular networks, public networks, etc. The network 44 may include at least one service related server. Although a PTT service will primarily be described below for purposes of example, other types of services could also be utilized in connection with embodiments of the present invention such as, for example, voice over IP, video telephony, video instant messaging and the like.

In an exemplary embodiment in which PTT communications are supported, the server may be a PTT server 46, which may be associated with, for example, the network nodes which have subscribed to a PTT service which may be provided over the network 44. The PTT server 46 may be capable of receiving and forwarding SIP and/or PTT signaling messages and/or messages from another protocol used for session/call setup. In an exemplary embodiment, the PTT server 46 may be a server or other computing device configured to enable communication of messages, such as SIP and/or PTT signaling messages, to and/or from the mobile terminals 40. As such, the PTT server 46 may also include elements similar to those of the mobile terminal 22 described in reference to FIG. 1, except that the PTT server 46 may not include the display 23. Although signals may be described hereinafter as passing between the mobile terminals 40, it should be understood that such signals are communicated via the network 44 and also via the PTT server 46 where applicable. It should also be understood that the mobile terminals 40 may be examples of the mobile terminal 22 of FIG. 1, or any other suitable communications device.

In addition to providing communication between the mobile terminals 40, the PTT server 46 may also be in communication with a subscriber database 48, which may provide information regarding subscription information or other service related details associated with each corresponding one of the mobile terminals 40. For example, the subscriber database 48 may include details regarding a service plan associated with a user of each corresponding one of the mobile terminals 40. The details regarding the service plan may include details regarding buddy list size information such as, for example, a number of total contacts supported, a number of groups supported, a number of contacts per group supported, etc. As such, the subscriber database 48 may include information regarding the buddy list size capability supported in association with the service plan associated (e.g., service plan based capabilities) with the user of each corresponding one of the mobile terminals 40.

As will become apparent below, it should be noted that buddy list size information may be associated with either a device (e.g., device based capabilities) or a service plan associated with a user (e.g., service plan based capabilities). Additionally, although buddy list size information is described herein as providing either device or service plan based capabilities, it should be understood that the capabilities could include one or more of the support criteria or parameters described above, or other criteria or parameters known in the art.

The subscriber database 48 may be embodied as a storage device which could include volatile and/or non-volatile memory. In an exemplary embodiment, the subscriber database 48 may be in communication with the PTT server 46 in order to provide information regarding a specific subscriber to the PTT server 46 in response to a request from the PTT server 46. For example, the subscriber database 48 may be configured to store buddy list size information associated with each subscriber as a buddy list size entry. The buddy list size entry could include, for example, one or more fields defining the service plan based capabilities associated with each subscriber. In other words, the subscriber database 48 may store information corresponding to the parameters or support criteria that define the level of service to be provided to a particular subscriber based, for example, on the particular subscriber's service plan. In an exemplary embodiment, the buddy list size entry may define a number of total contacts supported, a number of groups supported, and a number of contacts per group supported for each subscriber based on each subscriber's corresponding service plan (i.e., on a per subscriber basis).

The subscriber database 48 may be updatable under the control of a provisioning system 50. In other words, information regarding subscription plans and/or service levels which are to be provided to each corresponding subscriber (and the subscriber's corresponding mobile terminal 40) may be updated at the subscriber database 48 in response to information input at the provisioning system 50.

The provisioning system 50 may be embodied as any device or means embodied in either hardware, software, or a combination of hardware and software that is configured to receive input from service provider personnel or equipment and to create, modify, update or otherwise permit service provider control over subscription related information associated with each user of or subscriber to the corresponding service associated with the provisioning system 50. In an exemplary embodiment, the provisioning system 50 may be configured to provide updated subscription information for a particular user to be stored at the subscriber database 48. The updated subscription information may include, for example, information regarding the buddy list size capability which the PTT server 46 may support for each subscriber based on the service plan associated with each corresponding subscriber. In other words, in one exemplary embodiment, the service provider may be capable of updating the subscriber database 48 with respect to the buddy list size capability information for each subscriber based on the service plan associated with each corresponding subscriber. Thus, the service plan based capabilities may be updated at the subscriber database 48 in response to communication from the provisioning system 50 directing such an update. The update of service plan based capabilities, such as the buddy list size capability supportable based on the service plan of a user or subscriber, may occur, for example, in response to the user or subscriber purchasing a different service plan (or just a different buddy list size capability) via communication with the provisioning system 50. Alternatively, the update of the service plan based capabilities may occur in response to the expiration of a previously active service plan.

In an exemplary embodiment, the provisioning system 50 may be disposed at a physical point of sale location or may be a network component which may be distributed, or which may be accessed remotely by service provider personnel for the provision of service plan or buddy list size information changes to users. It should be noted that although the provisioning system 50, the subscriber database 48 and the PTT server 46 are each shown as being separate devices in FIG. 2, any two or even all of the provisioning system 50, the subscriber database 48 and the PTT server 46 may be collocated within a single device or at a single physical location. Alternatively, the provisioning system 50, the subscriber database 48 and/or the PTT server 46 may be separate devices in communication with each other via any wired or wireless network.

In an exemplary embodiment, as shown in FIG. 2, the PTT server 46 may include a querying element 52 and a determination element 53, each of which may be controlled by or otherwise embodied as a processing element such as the processing element 26. The querying element 52 may be embodied as any device or means embodied in either hardware, software, or a combination of hardware and software that is configured to receive a registration message from any one of the mobile terminals 40 and, in response to receipt of the registration message, query the subscriber database 48 regarding subscription related information such as buddy list size information (e.g., service plan based capabilities) associated with a particular subscriber associated with the mobile terminal 40 from which the registration message was received. In response to receipt of the query, the subscriber database 48 may provide the querying element 52 with the requested subscription related information (e.g., the service plan based capabilities). The querying element 52 may be configured to, thereafter, provide the subscription related information (e.g., the service plan based capabilities) to the determination element 53 for processing.

The determination element 53 may be embodied as any device or means embodied in either hardware, software, or a combination of hardware and software that is configured to receive subscription related information about a registering subscriber and to receive device capability information from a device being used to register a subscriber and determine session based capabilities to be supported based on the subscription related information and the device capability information. In an exemplary embodiment, the determination element 53 may receive service plan based capabilities defining buddy list size capabilities that are supportable based on the subscriber's service plan and also receive device based capabilities defining buddy list size capabilities that are supportable based on the subscriber's network node device. The determination element 53 may then determine session based capabilities to govern the current session based on the most limiting corresponding capabilities supported between the device and service plan based capabilities. For example, if the device based capabilities indicate support for 100 individual contacts, 50 groups and 20 contacts per group and the service plan based capabilities indicate support for 120 individual contacts, 40 groups and 25 contacts per group, then the session based capabilities may be determined as 100 individual contacts, 40 groups, and 20 contacts per group. As the foregoing exemplifies, the determination element 53 compares, for each individual capability, the support provided for that capability by the device on the one hand and the service plan on the other hand such that the session based capabilities may be defined in part by device based capabilities and in part by service plan based capabilities.

After the determination element 53 determines the session based capabilities, the session based capabilities may be communicated from the PTT server 46 to a corresponding mobile terminal via a response to the registration message. In an exemplary embodiment, the response to the registration message may include a field (e.g., a buddy list size extension) defining a buddy list capability parameter or support criteria (e.g., a session based capability) for the mobile terminal based on the subscription related information (e.g., service plan based capabilities) associated with the particular subscriber and the device limitations (e.g., device based capabilities), thereby indicating which buddy list capabilities may be applied at the mobile terminal 40 from which the registration message was received during the session associated with the registration message. In an exemplary embodiment, in addition to communicating the session based capabilities to the corresponding mobile terminal via the response, the PTT server 46 may also be configured to store the session based capabilities locally or at another location accessible to the PTT server 46 such as the subscriber database 48.

The mobile terminal 40 that had communicated the registration message to the PTT server 46 (e.g., mobile terminal 40') may be configured to determine information about the capabilities of the mobile terminal 40' or otherwise access stored information regarding the mobile terminal 40'. The accessed stored information may define, for example, the buddy list size information associated with the mobile terminal 40'. In other words, the mobile terminal 40' may be configured to access or determine information defining the buddy list capabilities associated with the mobile terminal 40' (e.g., device based capabilities). The mobile terminal 40' may be further configured to include the buddy list size information in, for example, a message communicated to the PTT server 46. In an exemplary embodiment, the mobile terminal 40' may be configured to include buddy list size information (e.g., device based capabilities) in a registration message that registers a network node (e.g., the mobile terminal 40') to a particular service. In this regard, the buddy list size information may be provided as an M-PTT extension (e.g., buddy list size extension), which may in an exemplary embodiment take the form "bls=xxx-yyy-zzz" where xxx defines a number of individual contacts supported, yyy defines a number of groups supported, and zzz defines a number of contacts per group supported by the mobile terminal 40'.

FIG. 3 illustrates a control flow diagram showing exemplary message flow for dynamically assigning a buddy list size capability to the mobile terminal 40' for a particular session. According to the example in FIG. 3, assume the mobile terminal 40' initially has a standard service package including standard service plan based capabilities (e.g., 100 individual contacts supported, 30 groups supported, and 25 contacts per group) supported based on the service plan of the subscriber associated with the mobile terminal 40'. As shown in FIG. 3, the mobile terminal 40' may communicate a registration message 80 to the PTT server 46. In an exemplary embodiment, the registration message 80 may be an M-PTT REGISTER message issued following a power up of the mobile terminal 40'. The registration message may include a buddy list size extension defining the device based capabilities (e.g., 150 individual contacts supported, 50 groups supported, and 20 contacts per group) supported by the mobile terminal 40'. In response to receipt of the registration message 80, the PTT server 46 may communicate a query 82 to the subscriber database 48 to determine the subscriber plan based capabilities of the subscriber associated with the mobile terminal 40'. In response to the query 82, the subscriber database 48 may communicate at least a service message 84 to the PIT server 46, in which the service message 84 includes the service plan based capabilities. Based on both the device based capabilities and the service plan based capabilities, the FIT server 46 may determine the session based capabilities for the session associated with the registration message 80 and communicate the session based capabilities to the mobile terminal 40' in the form of a buddy list size extension included with a response 86 (e.g., 200 OK) to the registration message 80. The mobile terminal 40' may then conduct the session for which the mobile terminal 40' has registered according to the session based capabilities defined for the current session. In an exemplary embodiment, in addition to communicating the session based capabilities to the mobile terminal 40' in the form of the buddy list size extension included with the response 86, the PTT server 46 may store the session based capabilities locally or at another location accessible to the. PTT server 46. For example, the PTT server 46 may store the session based capabilities at the subscriber database 48 at a location different than the location at which the service plan based capabilities are stored.

The subscriber associated with the mobile terminal 40' may decide to upgrade his or her device. For example, the subscriber may purchase an upgraded mobile terminal 40" having an improved buddy list size capability (e.g., device based capabilities including 250 individual contacts supported, 100 groups supported, and 30 contacts per group supported). Accordingly, when the subscriber powers up the upgraded mobile terminal 40", the upgraded mobile terminal may issue a REGISTER message 90 to the PTT server indicating the device based capabilities of the upgraded mobile terminal 40". In response to receipt of the REGISTER message 90, the PTT server 46 may communicate a query 92 to the subscriber database 48. In response to receipt of the query 92, the subscriber database 48 may communicate at least a service message 94 to the PTT server 46 indicating corresponding service plan based capabilities (e.g., the standard service plan capabilities) to be supported by the PTT server 46 based on the service plan. The PTT server 46 may determine the session based capabilities as described above and communicate a response 96 to the registration message (e.g., 200 OK) including the determined session based capabilities indicative of the corresponding buddy list size capabilities that will be supported for the current session responsive to the upgraded mobile terminal 40". The upgraded mobile terminal 40" may then conduct the current session in accordance with the session based capabilities. In the present example, the session based capabilities may be 100 individual contacts supported, 30 groups supported, and 25 contacts per group supported based on the more limiting parameter between the device and service plan based capabilities. As indicated above, in an exemplary embodiment, in addition to communicating the session based capabilities via the response 96, the PTT server 46 may store the session based capabilities locally or at another location such as the subscriber database 48.

If, at some later time, the subscriber associated with the upgraded mobile terminal 40" requests an upgrade (or downgrade) to the subscriber's service plan via the provisioning system 50, the provisioning system 50 may provide updated subscription information 100 to the subscriber database 48 updating the subscriber database 48 at least with respect to the service plan based capabilities stored in connection with the subscriber associated with the upgraded mobile terminal 40". Completion of the update at the subscriber database 48 may be communicated to the provisioning system 50 via an update complete message 102. Accordingly, if the upgraded mobile terminal 40" issues a REGISTER message 104 to the PTT server 46 indicating the device based capabilities of the upgraded mobile terminal 40", the PTT server 46 may communicate a query 106 to the subscriber database 48. In response to receipt of the query 106, the subscriber database 48 may communicate at least a service message 108 to the PTT server 46 indicating corresponding service plan based capabilities for the upgraded (or downgraded) buddy list size capabilities to be supported by the PTT server 46 based on the upgraded (or downgraded) service plan. The PTT server 46 may communicate a response 110 to the registration message (e.g., 200 OK) including session based capabilities indicative of the corresponding buddy list size capabilities that will be supported for the current session responsive to the upgraded (or downgraded) service plan. As indicated above, in an exemplary embodiment, in addition to communicating the session based capabilities via the response 110, the PTT server 46 may store the session based capabilities locally or at another location such as the subscriber database 48. The upgraded mobile terminal 40" may then conduct the current session in accordance with the session based capabilities. As an example, if the upgraded service plan included service plan based capabilities of 500 individual contacts supported, 100 groups supported, and 100 contacts per group supported, the session based capabilities may be determined to be 250 individual contacts supported, 100 groups supported, and 30 contacts per group supported since the device based capabilities would be most limiting in each respective category.

FIG. 4 is a flowchart according to an exemplary method and program product for providing dynamic assignment of session capabilities according to an exemplary embodiment of the present invention. As will be appreciated, for example, computer program instructions may be loaded onto a computer or other programmable apparatus (i.e., hardware) to produce a machine, such that instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

In this regard, one embodiment of a method of providing dynamic assignment of session capabilities, as shown in FIG. 4, may include receiving a message associated with a communication session with a network node at operation 200. The message may be, for example, a registration message for registering the network node to a PTT service. Service plan based capabilities associated with the network node may be acquired at operation 210. In an exemplary embodiment, operation 210 may include querying a subscriber database for the service plan based capabilities and receiving buddy list size information associated with a subscriber associated with the network node. In an exemplary embodiment, the buddy list size information may be stored and updatable on a per subscriber basis. At operation 220, device based capabilities associated with the network node may be received. Session based capabilities associated with the service may be determined based on the device based capabilities and the service plan based capabilities on a per subscriber basis at operation 230. Operation 230 may include, for example, selecting most limiting parameters for each corresponding parameter of the device based capabilities and the service plan based capabilities to determine the session based capabilities on the per subscriber basis. Operation 230 may be followed by an optional operation 235 of storing the session based capabilities locally or at another location such as the subscriber database. In an exemplary embodiment, the method may further include communicating the session based capabilities to the network node by transmitting a response to the registration message in which the response includes buddy list size information to be supported for a current session at operation 240.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:
receiving, by a server, an initial registration message for establishing a communication session with a subscriber network node, the initial registration message including device-based capabilities of the subscriber network node;
acquiring, by the server, service plan-based capabilities for a service subscription associated with the subscriber network node; and
determining, by the server, session-based capabilities associated with a service based on the received device-based capabilities and the acquired service plan-based capabilities on a per subscriber basis, wherein
determining the session-based capabilities comprises selecting a most limiting parameter from a parameter of the device-based capabilities and a corresponding parameter of the service plan-based capabilities to determine the session-based capabilities on the per subscriber basis.

2. The method of claim 1, wherein acquiring the service plan-based capabilities comprises querying a subscriber database for the service plan-based capabilities and receiving buddy list size information, the buddy list size information associated with a subscriber associated with the subscriber network node and updatable on a per subscriber basis.

3. The method of claim 1, further comprising updating the service plan-based capabilities in a subscriber database.

4. The method of claim 1, further comprising updating the device-based capabilities in a subscriber database by specifying the device-based capabilities in a registration message which is received by the subscriber database.

5. The method of claim 1, further comprising storing the session-based capabilities for a current session locally or at a subscriber database.

6. The method of claim 1, wherein receiving the initial registration message comprises receiving a registration message for registering the subscriber network node to a push-to-talk service.

7. The method of claim 1, further comprising communicating the session-based capabilities to the network node by transmitting a response to the initial registration message, the response including buddy list size information to be supported for a current session.

8. The method of claim 1, wherein the device-based capabilities are received in a response message to the initial registration message.

9. A computer program product comprising at least one non-transitory computer-readable storage medium having computer-readable program code to configure a computer as a server stored therein, the computer-readable program code comprising:
a first executable portion configuring the server to receive an initial registration message for establishing a communication session with a subscriber network node, the initial registration message including device-based capabilities of the subscriber network node;

a second executable portion configuring the server to acquire service plan-based capabilities for a service subscription associated with the subscriber network node; and a third executable portion configuring the server to determine session-based capabilities associated with a service based on the device-based capabilities and the service plan-based capabilities on a per subscriber basis, wherein the third executable portion includes instructions for selecting a most limiting parameter from a parameter of the device-based capabilities and a corresponding parameter of the service plan-based capabilities to determine the session-based capabilities on the per subscriber basis.

10. The computer program product of claim 9, wherein the second executable portion includes instructions for querying a subscriber database for the service plan-based capabilities and receiving buddy list size information, the buddy list size information associated with a subscriber associated with the subscriber network node and updatable on a per subscriber basis.

11. The computer program product of claim 9, further comprising a fourth executable portion for updating the service plan-based capabilities in a subscriber database.

12. The computer program product of claim 9, further comprising a fifth executable updating the device-based capabilities in the subscriber database by specifying the device-based capabilities in a registration message which is received by a subscriber database.

13. The computer program product of claim 9, further comprising a sixth executable portion for communicating the session-based capabilities to the subscriber network node by transmitting a response to the initial registration message, the response including buddy list size information to be supported for a current session.

14. A server apparatus comprising a processing element configured to:

receive, at the server apparatus an initial registration message for establishing a communication session with a subscriber network node, the initial registration message including device-based capabilities of the subscriber network node;

acquire, at the server apparatus, service plan-based capabilities for a service subscription associated with the subscriber network node; and determine, at the server apparatus, session-based capabilities associated with a service based on the device-based capabilities and the service plan-based capabilities on a per subscriber basis, wherein the processing element is further configured to select a most limiting parameter from a parameter of the device-based capabilities and a corresponding parameter of the service plan-based capabilities to determine the session-based capabilities on the per subscriber basis.

15. The apparatus of claim 14, wherein the processing element is further configured to query a subscriber database for the service plan-based capabilities and receive buddy list size information, the buddy list size information associated with a subscriber associated with the subscriber network node and updatable on a per subscriber basis.

16. The apparatus of claim 14, wherein the processing element is further configured to update the service plan-based capabilities in a subscriber database.

17. The apparatus of claim 14, wherein the processing element is further configured to update the device-based capabilities in a subscriber database by specifying the device-based capabilities in a registration message which is received by the subscriber database.

18. The apparatus of claim 14, wherein the processing element is further configured to communicate the session-based capabilities to the subscriber network node by transmitting a response to the initial registration message, the response including buddy list size information to be supported for a current session.

19. The apparatus of claim 14, wherein the processing element is further configured to receive the device-based capabilities in a response message to the initial registration message.

20. A system comprising:

a provisioning sub-system configured to enable modification to a subscriber service plan;

a subscriber database configured to store service plan-based capabilities for buddy list size on a per subscriber basis; and a server configured to:

receive an initial registration message for establishing a communication session with a subscriber network node, the initial registration message including device-based capabilities of the subscriber network node;

acquire the service plan-based capabilities for a service subscription associated with the subscriber network node from the subscriber database; and determine session-based capabilities associated with a service based on the device-based capabilities and the service plan-based capabilities on a per subscriber basis, wherein:

the function to determine the session-based capabilities comprises selecting a most limiting parameter from a parameter of the device-based capabilities and a corresponding parameter of the service plan-based capabilities to determine the session-based capabilities on the per subscriber basis; and the provisioning sub-system is further configured to communicate changes to the service plan-based capabilities to the subscriber database on a per subscriber basis and the subscriber database is configured to update the corresponding stored service plan-based capabilities.

* * * * *